B. P. STEDMAN.
GATE.
APPLICATION FILED JUNE 12, 1916.
1,253,742.
Patented Jan. 15, 1918.
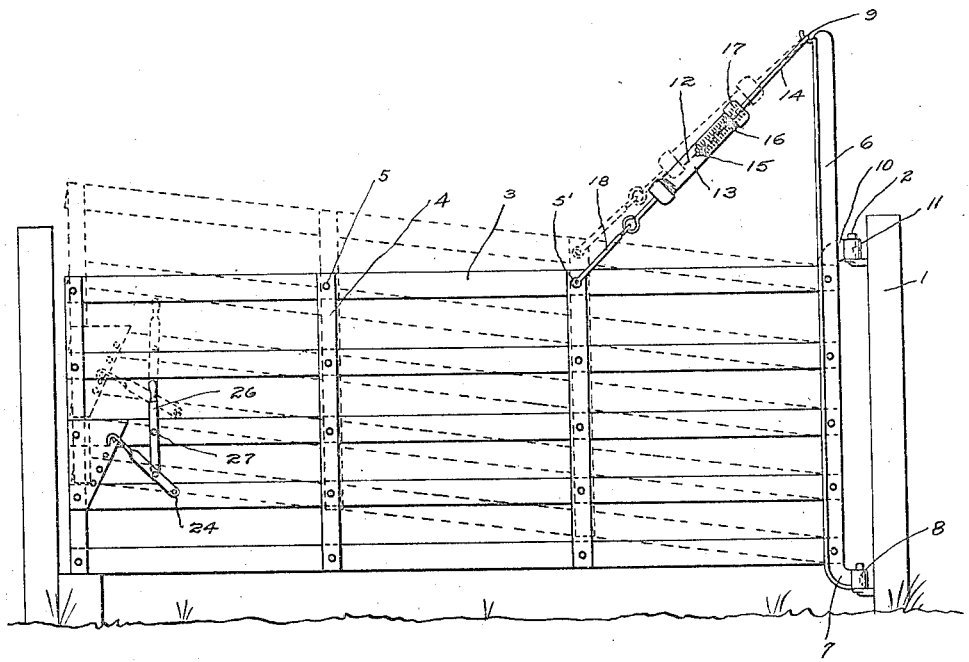
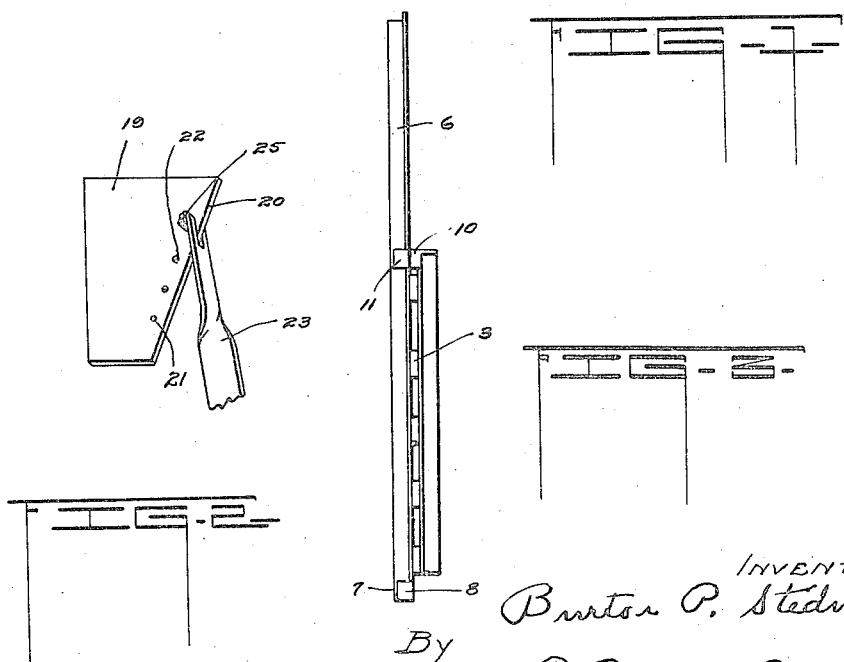
INVENTOR
Burton P. Stedman
By
LaPorte & Bean,
Attys.

UNITED STATES PATENT OFFICE.

BURTON P. STEDMAN, OF PEORIA, ILLINOIS.

GATE.

1,253,742.   Specification of Letters Patent.   Patented Jan. 15, 1918.

Application filed June 12, 1916. Serial No. 103,307.

*To all whom it may concern:*

Be it known that I, BURTON P. STEDMAN, a citizen of the United States, a resident of Peoria, in the county of Peoria and State of Illinois, have invented new and useful Improvements in Gates, of which the following is a specification.

My invention relates to improvements in gates and particularly swinging gates which are termed self supporting, which may be readily raised and lowered for the various purposes necessary in connection with gates of this character.

To the accomplishment of the foregoing and such other objects as may hereinafter appear, my invention consists in the combination, construction and arrangement of parts hereinafter described and then sought to be defined in the appended claims, reference being had to the accompanying drawings forming a part hereof, and which show merely for the purpose of illustrative disclosure, a preferred embodiment of my invention, it being understood that various changes may be made in practice within the scope of the claims without digressing from my inventive idea.

In the drawings,

Figure 1 represents a side elevation of a gate constructed according to my invention, the normal position of the gate being shown in full lines, and the gate being shown in an elevated position in dotted lines;

Fig. 2 is a detail view of the locking means for supporting the gate and suspending it in elevated position.

Fig. 3 is an elevation of the hinge end of the gate.

Referring now to the drawings, the numeral 1 designates the usual posts or supports for the gate, the one having the usual pintles 2 on which the gate is hung and pivoted. The gate itself comprises the longitudinal bars or members 3 and the transverse bars or members 4, the latter being arranged in pairs on opposite sides of the former, and a bolt or rivet 5 passed therethrough to form a pivotal connection so that the gate is "flexible."

The hinge end of the gate is of novel construction, including the long transverse member 6 having its lower end bent as at 7 and formed with an eye 8 to receive the lower pintle 2. This member 6 extends above the top longitudinal member 3 and is provided with a hook 9, the purposes of which will be presently described. The complementary transverse member 10 is secured to the other side of the hinge end of the gate and has the eye 11 at its upper end to receive the upper pintle 2.

The gate is self supporting, as stated hereinbefore, this being accomplished by the following means. The spring member 12 includes the barrel 13 having the rod 14 connected to the hook 9 and extending into the barrel 13 with a washer 15 on the end and a coil spring 16 embracing the same, and positioned between the washer and cap 17 of the barrel. The lower end of the barrel is connected by means of link 18 to the upper portion of the gate, preferably at the upper pivotal connection 5 for the rear pair of transverse members 14. The spring within the barrel is normally adjusted so as to support the gate so that the same may be readily moved from its normal horizontal position as shown in full lines, to its elevated position indicated in dotted lines, without the expenditure of much energy. This is of course desirable in opening the gate when obstructions, such as ice, snow, etc., are in the way.

If it is desired to sustain the gate in elevated position so as to permit the passage of small stock thereunder, I provide the holding plate 19 which is secured to one of the front transverse members 4 and has the inclined edge 20 provided with the plurality of apertures 21 adapted to receive the pin, nail or other suitable element 22. The locking member 23 is pivotally mounted as at 24 to one of the longitudinal members of the gate and is provided with the bifurcated hooked end 25 which embraces the inclined edge of the plate 19 and engages the pin, nail or other suitable element 22, as illustrated in the drawing. This locking member 23 is controlled by means of the hand lever 26 pivoted at 27 to one of the longitudinal members of the gate. This provides a simple and efficient means for holding the gate in an elevated position, to which it is easily raised, due to the resilient support therefor.

What I claim is:—

1. In combination in a gate having a plurality of longitudinal members and a plurality of transverse members pivotally connected together so as to provide a vertical shiftable gate, an extension at the hinge end of the gate, a spring member connected to the upper end of said extension and to the upper portion of the gate including a barrel, a rod extending within the barrel and having a washer on its end, and a spring embracing said rod and interposed between said washer and the end of the barrel, and means at the front or latch end of the gate for holding the same in elevated position.

2. In combination in a gate having a plurality of longitudinal members and a plurality of transverse members pivotally connected together so as to provide a vertical shiftable gate, an extension at the hinge end of the gate and a spring connection between said extension and the upper portion of the gate for normally supporting said gate and permitting its ready vertical movement, and means on the latch end of the gate for locking the same in its various elevated positions, said means including a plate having a plurality of apertures adapted to receive a pin and a locking member pivotally connected to the gate, and provided with a bifurcated hooked end adapted to embrace said plate and engage said pin which may be positioned in any of said apertures.

3. In combination in a gate, having a plurality of longitudinal members and a plurality of transverse members arranged in pairs on opposite sides of said longitudinal members and pivotally connected together to each of said longitudinal members so as to provide a vertical shiftable gate, an extension at the hinge end of the gate, resilient means connecting said extension with the upper pivotal point of the pair of intermediate transverse members located next to the pair of transverse members at the hinge end of the gate, and means at the front or latch end of the gate for holding the same in its vertical shiftable positions.

BURTON P. STEDMAN.

Copies of this patent may be obtained for five cents each, by addressing the "Commissioner of Patents, Washington, D. C."